United States Patent
Bleyer et al.

(10) Patent No.: US 10,302,739 B2
(45) Date of Patent: May 28, 2019

(54) KIT FOR A MODULAR RADAR SYSTEM

(71) Applicant: ESG Elektroniksystem- und Logistik-GmbH, Fürstenfeldbruck (DE)

(72) Inventors: Fabian Bleyer, Landsberg am Lech (DE); Georg Rauch, Munich (DE)

(73) Assignee: ESG Elektroniksystem- und Logistik-GmbH, Fürstenfeldbruck (DE)

( * ) Notice: Subject to any disclaimer, the term of this patent is extended or adjusted under 35 U.S.C. 154(b) by 368 days.

(21) Appl. No.: 15/374,085

(22) Filed: Dec. 9, 2016

(65) Prior Publication Data

US 2017/0168136 A1    Jun. 15, 2017

(30) Foreign Application Priority Data

Dec. 9, 2015   (DE) .......................... 10 2015 121 451

(51) Int. Cl.
  *G01S 7/02*     (2006.01)
  *G01S 7/03*     (2006.01)
  *G01S 7/481*    (2006.01)
  *H01Q 1/42*     (2006.01)

(52) U.S. Cl.
  CPC ............... *G01S 7/02* (2013.01); *G01S 7/032* (2013.01); *G01S 7/4813* (2013.01); *G01S 2007/027* (2013.01); *G01S 2007/028* (2013.01); *H01Q 1/42* (2013.01)

(58) Field of Classification Search
  CPC .... G01S 2007/027; G01S 13/931; G01S 7/02; G01S 2007/028; G01S 7/032; G01S 7/03; H01Q 1/3233; H01Q 1/42; H05K 7/1427; H05K 9/0007; H01R 13/6658; H01R 13/6683
  See application file for complete search history.

(56) References Cited

U.S. PATENT DOCUMENTS

| | | | | |
|---|---|---|---|---|
| 7,603,097 | B2 * | 10/2009 | Leblanc | ................. G01S 7/032 342/70 |
| 10,073,163 | B2 * | 9/2018 | Philipp | ................ H05K 5/0069 |
| 2016/0268693 | A1 * | 9/2016 | Ding | ......................... G01S 7/03 |

FOREIGN PATENT DOCUMENTS

DE    102011052363 A1    2/2013

\* cited by examiner

*Primary Examiner* — Olumide Ajibade Akonai
(74) *Attorney, Agent, or Firm* — Ewers & Hasselmann PLLC (57) ABSTRACT

A kit for a modular radar system is provided. The kit includes a basic unit with a housing, a top cover and a bottom cover. A first circuit board with a first plug connector is fastened to an underside of the basic unit. The basic unit is subdivided into a first and second cell by partition walls. The first cell includes a radar module and the second cell includes a second circuit board. The top cover has a radome in the area of the first cell. The bottom cover includes a power supply module and a data interface module. The upper side of the bottom cover includes at least one plug connector for connecting to a plug connector on the underside of the first circuit board and to connect the power supply module and the data interface to the processing unit and/or the radar module.

15 Claims, 9 Drawing Sheets

KIT FOR A MODULAR RADAR SYSTEM

CROSS REFERENCE TO RELATED APPLICATIONS

This application claims priority of German patent application no. 10 2015 121 451.2, filed Dec. 9, 2015, the entire content of which is incorporated herein by reference.

FIELD OF THE INVENTION

The invention relates to a kit for a modular radar system.

BACKGROUND OF THE INVENTION

Radar systems are available in many different variants and types as well as with varied technical capabilities.

One problem in this respect is that different devices are provided for different radar technical, sensor technical, or processing technical capabilities, which is disadvantageous both in regard to costs and in regard to flexibility.

SUMMARY OF THE INVENTION

It is an object of the present invention to provide a kit for a modular radar system which avoids the disadvantages of the prior art and, in a flexible and cost-effective manner, enables providing various radar systems with differing radar technical and possibly sensor technical capabilities.

According to an aspect of the invention, a kit for a modular radar system is provided which includes: a basic unit having a housing open at the top side with side faces and a first printed circuit board fastened to an underside of the basic unit, the basic unit being subdivided into at least one first and one second cell by one or more partition walls configured as electromagnetic compatibility (EMC) partition panels, wherein the first cell is configured for receiving a radar module elected from a plurality of selectable radar modules, and on the first printed circuit board in an area of the first cell, a first plug connector for connecting the selected radar module is provided; wherein the second cell is configured for receiving at least one second circuit board having a processing unit for connecting to the radar module, and on the first circuit board in and area of the second cell, a second plug connector is provided for connecting the processing unit, and wherein the first circuit board is configured with electrical connections between the first and second plug connectors to connect the processing unit with the radar module, and wherein the first circuit board has a third plug connector arranged on an underside of the first circuit board; a top cover for the basic unit configured for being fastened to the basic unit, the top cover having a radome in the area of the first cell; a bottom cover for the basic unit configured for being fastened to the basic unit, the bottom cover having a power supply module configured for supplying a voltage, a data interface module configured for transferring data, and a fourth plug connector arranged on an upper side of the bottom cover and configured for connecting the fourth plug connector to the third plug connector on the underside of the first circuit board corresponding thereto, and to connect the power supply module and the data interface to the processing unit and/or to the radar module.

The basic unit has a housing that is open at the top side with side faces and a first circuit board fastened to underside of the basic unit. The basic unit is subdivided into at least one first and one second cell by one or more partition walls that are configured as EMC partition panels.

The first cell for receiving a first radar module is configured of a plurality of selectable radar modules, and on the first circuit board in the area of the first cell, a first plug connector for connecting the selected radar module is provided.

The second cell is configured for receiving at least one circuit board having a processing unit for connecting the selected radar module, and on the first circuit board in the area of the second cell, a second plug connector is provided for connecting the processing unit.

The first circuit board is configured with electrical connections between the first and second plug connectors to connect the processing unit and the radar module, and further has a third plug connector on the underside.

The kit further includes a top cover for the basic unit for fastening to the basic unit, the top cover having a radome in the area of the first cell, a bottom cover for the basic unit for fastening to the basic unit, having a power supply module for the power supply and preferably a data interface module for transferring data, as well as on the upper side of the bottom cover at least one fourth plug connector for connecting to the third plug connector on the underside of the first circuit board corresponding thereto, to connect the power supply module and the data interface to the processing unit and/or the radar module.

In this way, a kit is provided which makes it possible to integrate different radar modules into a basic unit and thus to provide radar systems with different capabilities in a flexible and cost-effective manner.

The data interface module may have specific interface modules, such as for Ethernet, but, in the simplest case, may also consist of a cable connection by which the data delivered by the processing unit via the third plug connector are transferred through the bottom cover into the area outside of the radar system.

According to another aspect of the invention, the kit further includes: a third cell configured in the basic unit for receiving a sensor module, in particular an optical sensor module, an electro-optical sensor module, or an electronic sensor module, wherein on the first circuit board in the area of the third cell a fifth plug connector is provided for connecting to the processing unit and for its connection to the processing module. The top cover in the area of the third cell has an optical window to enable the optical sensor module to acquire data.

In this way, in addition to different radar-technical capabilities, it is possible to also integrate optical sensor capabilities in the modular radar system as necessary.

In accordance with another aspect of the invention, the kit further includes an extension unit for hardening against environmental effects having a housing open at the top side with side faces and a bottom cover fastened to the underside of the basic unit or integrally configured with the housing, with a third circuit board with electrical connections configured therein, the extension unit including: a first area for receiving said basic unit, a second area for receiving a power supply module, wherein on the top of the third circuit board in the first area a sixth plug connector is provided to connect the basic unit by the third plug connector on the underside of the first circuit board of the basic unit to the extension unit, wherein on the top of the third circuit board in the second area at least a seventh plug connector is provided to connect the power supply module to the extension unit, wherein the third circuit board is configured in such a way that the leads configured therein are linked to one another via the basic unit connected via the sixth and seventh plug connectors or the power supply module, respectively, as well a data interface preferably present on the third circuit board is being connected to the base so as to connect the power supply module connected to the extension unit and the preferably present data interface to the processing unit and/or the radar module. The kit further includes a first top cover for the extension unit for fastening to the extension unit, the first top cover having, within the first area in the area of the first cell of the basic unit, a radome, preferably also, in the area of the third cell, an optical window as well as on the underside of the bottom cover at least an eighth plug connector to connect the power supply module via the third circuit board to an external power supply and to transfer the data supplied by the processing unit by the preferably present data interface to another processing unit or a storage unit outside of the modular radar system.

This makes it possible to "harden" the modular radar system against environmental effects such as electromagnetic interference in a simple and flexible manner.

The data interface may have specific interface modules, such as for Ethernet, but, in the simplest case, may also consist of a cable connection by which the data delivered by the processing unit via the third plug connector are transferred from the third circuit board through the bottom cover into the area outside of the radar system.

In accordance with another aspect of the invention, the power supply module has three separate stages, preferably separate boards connected to one another by plug connectors, namely a protection stage for shielding and filtering line-connected electromagnetic interference and/or the protection against overvoltage and undervoltage, a hold-up stage with large capacitors and a control unit to continue supplying power to the device in the event of interruptions of power supply, and a supply stage with the required DC-DC converters and preferably additional regulators to deliver the required supply voltages.

This makes it possible to provide a particularly stable voltage supply that is hardened against environmental effects.

In accordance with yet another aspect of the invention, the seventh plug connector for connecting the power supply module has an input plug connector connected to the eighth plug connector and connecting the power supply module to an external power supply as well as an output plug connector to deliver the supply voltage delivered by the power supply module via the third circuit board to the connected basic module, whereby an EMC shield is preferably provided in the second area which is only perforated by the input connector. This makes it possible to provide a particularly good EMC shielding.

In accordance with another aspect of the invention, the kit further includes: a third top cover for the extension unit to be used in place of the second top cover for the extension unit for fastening to the extension unit, the third top cover including: a patch-array radar module mounted on the inside of the third top cover, as well as a radome above the patch-array radar module, and a second processing unit connected to the underside of the patch-array radar module by a plug connector, which can be connected to the corresponding first plug connector of the first circuit board by a plug connector provided at its underside.

This makes it possible, in addition to using of a plurality of radar modules for use in the basic unit, to use a patch-array radar module and to provide a corresponding radar system.

According to another aspect of the invention, on two side walls of the basic unit guide grooves are provided to insert the second circuit board into the basic unit and to fix it therein, wherein guide grooves for fixing the second circuit board when the top cover is fastened are likewise provided in the top cover as well as on the top of the lower termination of the basic unit.

This makes it possible to fix the second circuit board in the basic unit in a particularly simple and stable manner.

According to a further aspect of the invention, the third cell also has guide grooves to enable the stable integration of a circuit board, if required.

According to yet another aspect of the invention, an EMC shielding plate is provided on the bottom cover to shield the power supply module and the data interface module from the first circuit board of the basic unit after attaching the lower cover to the basic unit. Thus a shielding against interfering influences is achieved.

According to another aspect of the invention, guide grooves are provided in the extension unit to fix the power supply unit upon insertion in the extension unit and/or secure it against lateral sliding. As a result, the power supply unit can be stably fixed within the extension unit in a simple manner.

According to yet another aspect of the invention, at least two, preferably four, grooves or preferably rounded guide edges are provided in the extension unit which guide the basic unit vertically along two or preferably four of its preferably also rounded outer edges with a defined tolerance. This makes it possible to fix the basic unit in the extension unit in a simple yet stable manner.

According to another aspect of the invention, the second top cover for the extension unit has on its underside the same structural elements as the top cover of the basic unit to achieve a cover of the basic unit in the same way as the first cover and to stabilize the basic unit additionally by interlocking structural features between the basic unit and the second top cover.

Thus a cover and stabilization of the basic unit within the extension unit is achieved in a particularly efficient manner.

BRIEF DESCRIPTION OF THE DRAWINGS

The invention will now be described with reference to the drawings wherein.

DESCRIPTION OF THE PREFERRED EMBODIMENTS OF THE INVENTION

The invention is described in detail below with reference to various exemplary embodiments. The exemplary embodiments are in each case a device system composed of a kit for a modular radar system or a scalable device system for generating different radar apparatuses, which may, however, in some exemplary embodiments also contain additional sensor modules, such as, for example, an electro-optical/electronic sensor module.

The systemic approach of the invention makes possible an efficient and demand-driven device manufacture with a very high degree of variation while at the same time meeting very high quality and safety requirements. In addition to various forms of radar sensor technology, these can optionally be supplemented by an additional "non"-radar sensor, such as IR, or HD CCD camera modules, or an inertial system module, respectively.

In the case of the radar sensor modules, it is thereby possible to choose between different antenna variants, combinations, and arrangements. This selection extends from the discrete single radar measurement to multi-target measurement with full imaging capabilities.

In various exemplary embodiments, the kit system is characterized by the fact that it becomes possible to produce high-precision miniature millimeter-wave radar sensors in various functional performance classes with various additional integrable sensor options which are suitable for both aviation and industrial applications—and in a very flexible and cost-efficient manner. Due to the consistent multiple use of the functional system core, the "basic unit", in combination with only a few additional system housing components (e.g. top and bottom cover, extension unit for environmental hardening) and a large selection of integrable sensor modules, both on a radar and for example also on a camera basis, it is possible to deliver to customers "just in time" a radar configuration that meets their requirements in a clearly defined framework. Due to the modular design, future developments or new configurations can be incorporated relatively easily into the device system.

Figure 1:
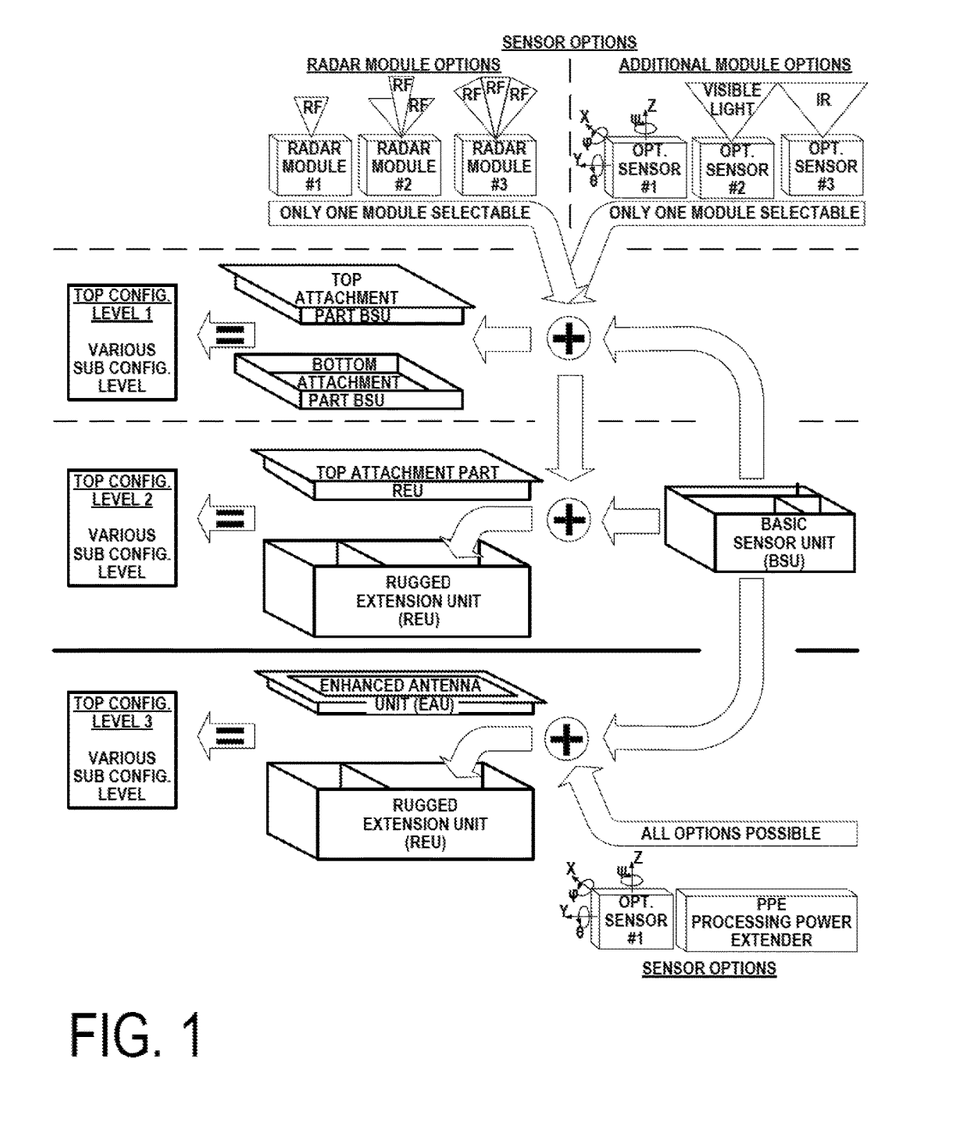
FIG. 1 shows modular components of a kit and provides an overview of a scalable device system according to an exemplary embodiment of the invention.

In various exemplary embodiments, the device system is suitable, among other things, for providing sensor devices which can be operated in the short range <250 m under the most harsh environmental conditions (RTCA DO-160, MIL-STD 810) and in degraded visual environments, e.g. smoke, dust, fog, or snow, with a clearly defined reliability (e.g. design assurance level) and with the highest precision. An overview of the scalable kit in accordance with an exemplary embodiment is shown in FIG. 1. The kit in this case includes the following elements:

Basic unit (hereinafter referred to as basic sensor unit, BSU) as a functional core unit of the entire system for communication, control, data processing and accommodation of the discrete radar sensors as well as optional additional sensors.

Top and bottom covers of the basic unit (hereinafter referred to as BSU attachment parts), the covers partially containing functional elements to use the basic unit (BSU) itself as a device.

Extension unit for environmental hardening (hereinafter referred to as rugged extension unit, REU) as an environmentally hardened carrier platform for the BSU basic unit and with an extended power supply for environmental hardening as well as for use as basis for additional extension stages.

Second top cover with patch-array radar module (hereinafter referred to as enhanced antenna unit, EAU) as a capability extension from discrete radar sensor technology to multi-target measurement or imaging radar measurement. Depending on the antenna configuration, drift or vertical speed measurements can also be performed.

From the kit, three main extension stages, hereinafter referred to as "top configuration levels" (TCL), can be generated in various exemplary embodiments. For TCL1, the BSU is equipped with the corresponding top and bottom covers (top and bottom attachment parts). Depending on the requirements, a radar module selected from a plurality of possible radar modules and/or optionally and in addition an electro-optical/electronic sensor module, which can also be selected from a plurality of possible sensor modules, where appropriate, for example an IR camera/inertial sensor, can be previously integrated in the BSU.

Radar modules from which a radar module can be selected, according to one exemplary embodiment, may be, for example: a dual-beam radar module with two different opening angles for the near and far range.

Electro-optical/electronic sensor modules from which a sensor module can be selected, according to one exemplary embodiment, may be, for example: LWIR camera module/MEMS inertial sensor module.

It is similar with the second main extension stage, TCL2. As shown in FIG. 1, the BSU basic unit is integrated into the extension unit (REU) with the selected integrated sensor modules (radar module plus optionally an electro-optical/electronic sensor module).

In the third main extension stage of the kit (TCL3), according to an exemplary embodiment, a technology leap takes place in regard to radar technology from the discrete radar antenna configuration to the patch-array antenna configuration. In the process, the BSU is integrated into the REU without additional radar sensor modules, but with an optional additional sensor, however, instead of the first top cover of the extension unit a second top cover of the extension unit is used into which a patch-array antenna field is integrated. Said second top cover of the extension unit is therefore also referred to hereinafter as the "enhanced antenna unit" (EAU), and it is mounted on the REU extension unit. The EAU now provides the radar technology for the third main extension stage, TCL3—instead of the radar module included in the first cell of the basic unit.

Figure 2:
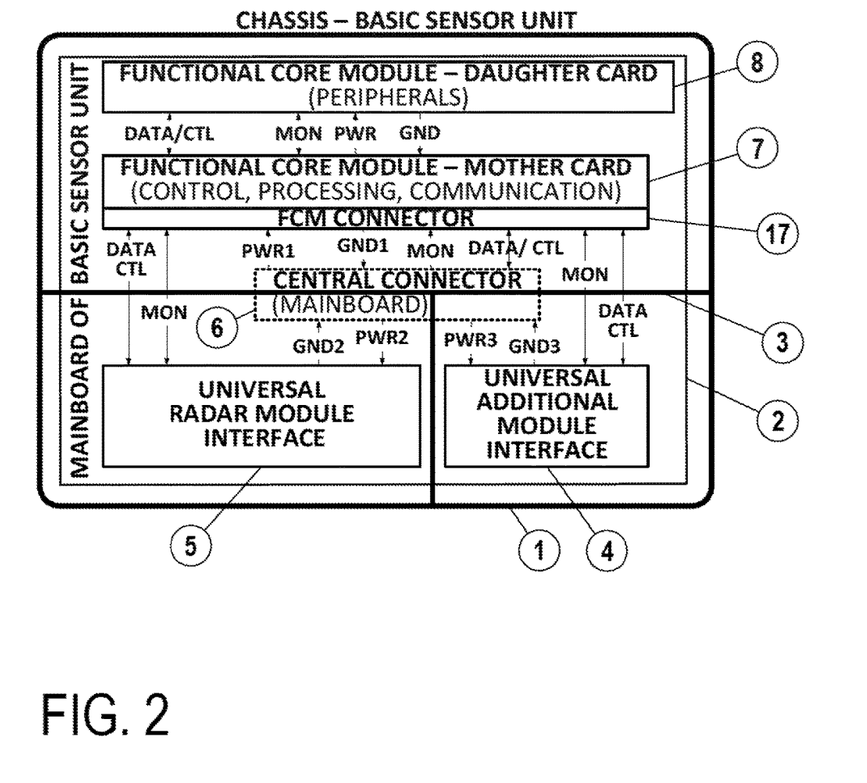
FIG. 2. is a schematic view of a Basic Sensor Unit (BSU) according to an exemplary embodiment of the invention.

The basic unit (basic sensor unit, BSU) forms the functional core of the kit, it is used in all extension stages. FIG. 2 shows a schematic sketch of the internal structure and the interconnection of the basic unit, whereas FIG. 3 shows a perspective view of the basic unit from the top (FIG. 3, left-hand side) and from the bottom (FIG. 3, right-hand side).

Figure 3:
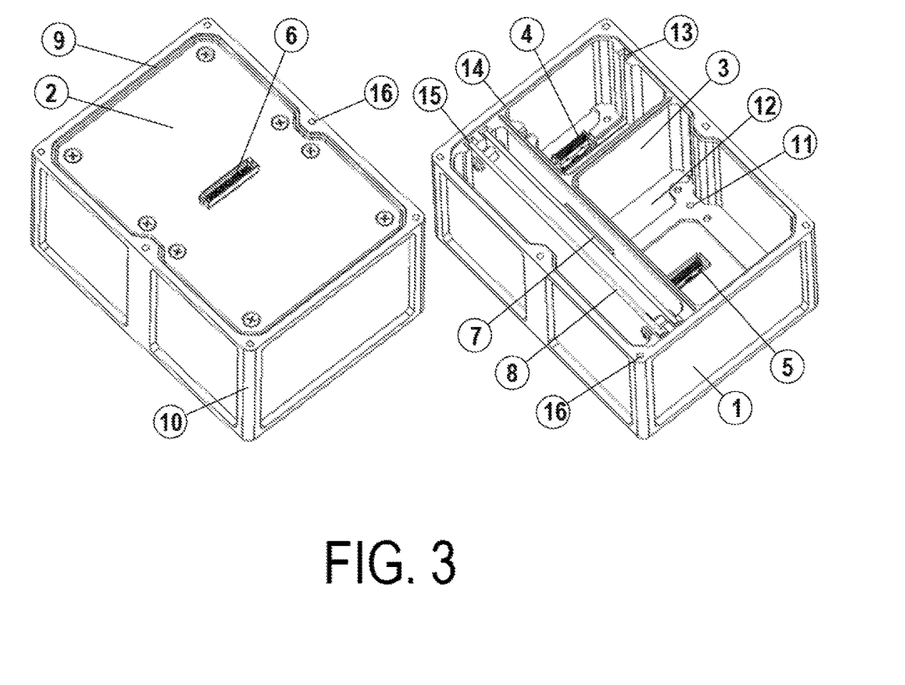
FIG. 3 shows perspective views of the BSU from the top and from the bottom according to an exemplary embodiment of the invention.

As shown in FIG. 3, the basic unit includes a housing or chassis 1, which preferably serves as an EMC-shielded housing and carrier element of the various assemblies and modules to be integrated. On the underside of the chassis, a (first) circuit board, also referred to as a "mainboard", is provided, which may be bolted, for example, to the housing or attached to it in another manner. It establishes the electrical connections between the modules (radar module, optional sensor module, and processing unit) to be installed in the BSU via plug connectors 6, 5, 4, 17. See also FIGS. 2 and 3.

The chassis divides the existing internal installation space by EMC partition panels 3 into at least two, or three in accordance with another exemplary embodiment as shown in FIG. 3, cells which are electromagnetically shielded from one another. Two cells are provided for sensors, one for radar and one for additional uses, e.g. optical or position. The third cell includes at least one second circuit board, possibly also two second circuit boards, hereinafter also referred to as "functional core modules" (FCM), which in the case of one circuit board include a mother card 7 and which is connected to the mainboard. This can be supplemented by a daughter card 8 to connect additional peripheral modules, such as pressure or vibration sensors as well as memory or processor modules.

The second circuit board includes a processing unit for processing the data and/or controlling the radar module, and possibly also the optional sensor module. The processing unit includes, for example, a computing unit, such as, for example, a system-on-chip module combining a dual-core processor and an FPGA fabric on a chip with additional peripherals, e.g. Ethernet. Preferably, the processing unit is configured so as to fully realizing the complete core functions up to a defined complexity level (for example imaging radar) on one module. The function control as well as the peripheral sensor data processing thereby takes place on the dual-core processors. Interface implementations, such as Ethernet or ARINC429 as well as ARINC664, can be outsourced to the FPGA fabric. The monitoring and error handling of the BSU as well as all other module and system components is also processed in the FPGA.

The second circuit board (FCM), in accordance with an exemplary embodiment, is not bolted but inserted into the basic unit only by using guide grooves 15 in the basic unit chassis. These guide grooves are also at the bottom of the BSU chassis as well as in the placeable top attachment parts. When the housing is completely closed, the FCM is laterally guided in a groove on all four sides of the board, is fixed and can thus not slip.

The same fastening concept is also used later in accordance with an exemplary embodiment of the extension unit still to be described.

As can be seen in FIG. 2, in the area of the first cell a first plug connector 5 for connecting a radar module is provided. Further, a second plug connector 17 is provided in the region of the second cell for connecting the processing unit (FCM) located on the second circuit board.

In accordance with the exemplary embodiment shown in FIG. 3, two second circuit boards are provided, a mother card and a daughter card, which are then either both connected to the first circuit board via the second plug connector or via separate plug connectors.

The top or bottom cover of the basic unit used in the first main extension stage (TCL1) will be described below.

Figure 4:
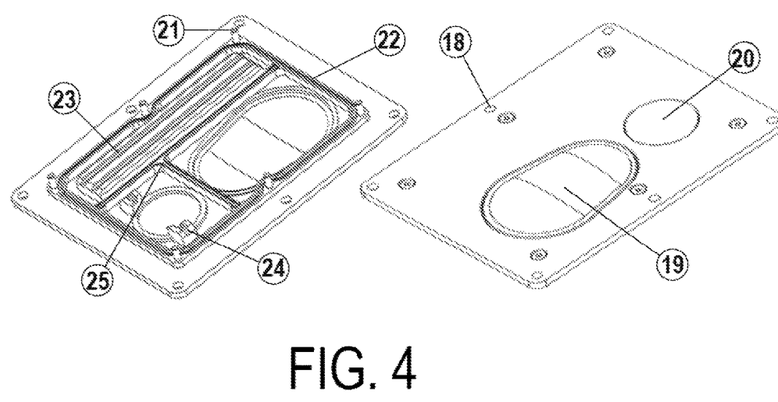
FIG. 4 shows a top attachment part of the BSU according to an exemplary embodiment of the invention.

If the basic unit is to be operated in the extension stage 1 and thus to represent the TCL1, two additional system components are necessary, the top or bottom cover, respectively, or rather the top BSU attachment part and the bottom BSU attachment part for the top and bottom, respectively. The top attachment part BSU (TAP-BSU) (see FIG. 4), in accordance with an exemplary embodiment, includes a solid, electrically conductive housing element 18 made of aluminum, which also contains the mounting bores. A set of bores is used for the screw connection 21 of the top attachment part with the BSU. The other set of bores 18 is used to mount the TCL1 device later in the respective application. In addition, in the top part, above the first cell of the basic unit, the radome 19 for the radar sensor is also located as well as above the third cell the optical window 20 with the corresponding EMC filter coating for the optional sensor. On the underside of the top part are the guide grooves for the FCM 23 and the guide grooves for an optional sensor module 24. The EMC partition panels inside the BSU chassis close tightly with the corresponding counterparts in the top part 25. The top part also includes a circular sealing profile with a rubber seal 22 which seals the housing during assembly with the BSU chassis with its sealing profile 14.

The bottom cover of the basic unit is now described below in accordance with an exemplary embodiment.

Figure 5:
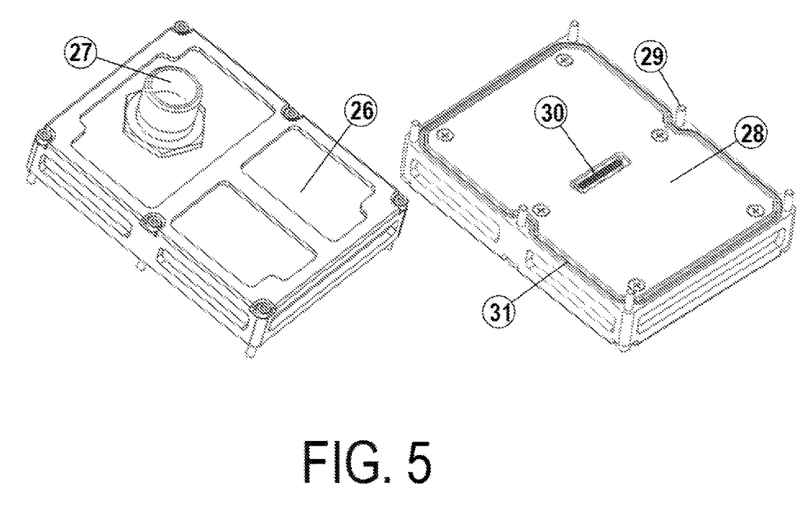
FIG. 5 shows a bottom attachment part of the BSU according to an exemplary embodiment of the invention.

In accordance with an exemplary embodiment, the bottom cover or "bottom attachment part—BSU (BAP-BSU)" (see FIG. 5) includes a power supply module and a data interface module (e.g. applied on a circuit board) for transmitting data (power supply & data interface module, PS/DIM) for the radar system in accordance with the main extension stage 1 (TCL1). The BAP-BSU bottom cover includes a solid, electrically conductive housing element 26, for example made of aluminum, which is connected to the BSU basic unit via the sealing profile 31 with a corresponding rubber seal and by screws through the provided bores 29. Via an EMC shielding plate 28, the PS/DIM, after assembly with the BSU basic unit, is shielded from its first circuit board (mainboard) to reduce interfering influences. The bottom cover accommodates, alongside the actual device connector plug 27 on its underside, a plug connector (PS/DIM module connector 30) on the upper side serving as the counterpart of the third plug connector of the first circuit board, also referred to as the central connector (see FIG. 3). Via the device connector plug 27 on the underside the connections for power supply and data are then guided outwards.

In accordance with an exemplary embodiment, on the circuit board with the power supply module and the data interface module, some additional components are installed, such as e.g. protective diodes for the input and output signals, DC-DC converters, interface drivers for e.g. the ARINC429 bus and signal transmitters for the Ethernet connection.

Figure 6:
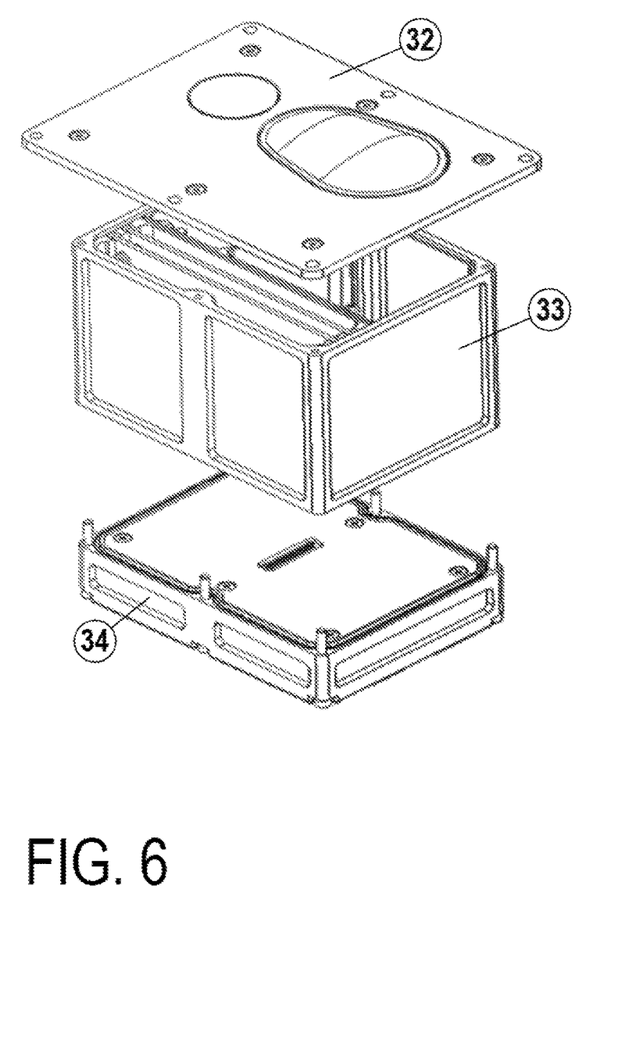
FIG. 6 shows a top configuration level 1 without sensors according to an exemplary embodiment of the invention.

If the basic unit chassis 33 is assembled together with the TAP-BSU top cover 32 and the BAP-BSU bottom cover 34 in the manner shown in FIG. 6, a modular radar system in accordance with the main extension stage 1 (TCL1) is achieved.

The main extension stage 2 (TCL2) in accordance with an exemplary embodiment is now described below. In this case, as described below, the basic unit is incorporated into an extension unit (rugged extension unit, REU) for environmental hardening.

First, the extension unit (rugged extension unit, REU) is described in accordance with an exemplary embodiment.

Said extension unit (rugged extension unit, REU), as the name implies, serves for environmental hardening, preferably in the area of lightning protection, power interruptions, and electromagnetic immunity with respect to the RTCA-DO-160 environmental qualification standard for aviation. In addition, the REU, in conjunction with the BSU, forms the basis for an additional function-enhancing extension stage.

Figure 7:
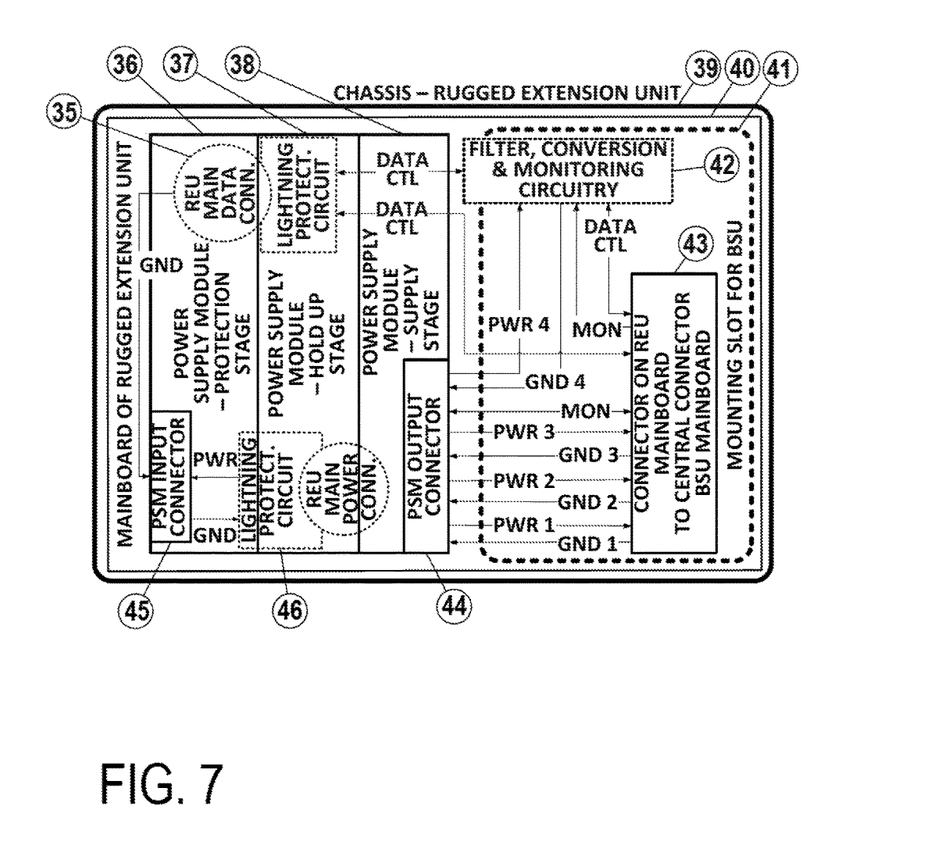
FIG. 7 is a schematic view of a Rugged Extension Unit (REU) illustrating a functional relationship within the REU according to an exemplary embodiment of the invention.

FIG. 7 shows a principle sketch illustrating the functional relationship within the REU. The REU includes a housing or chassis 39 made of an aluminum alloy or a solid, electrically conductive material alloy which, in addition to heat dissipation, also serves for electromagnetic shielding. The chassis also carries all other attachments and modules. Within the chassis a large installation space is located in which all other components are integrated.

On the bottom of the chassis, a third circuit board, the mainboard of the REU 40, is mounted, accommodating on the underside at least an eighth plug connector, preferably in the form of two separate plug connectors, namely the two external device connector plugs for data 35 and power 45 with their corresponding protective circuits, on the upper side at least a sixth plug connector for connecting the power supply module, in the present case designed in the form of two plug connectors, namely the input plug connector 45 and the output plug connector 44 of the power supply module, as well as additionally a seventh plug connector 43 for connecting the third connector (BSU central connector) of the first circuit board of the basic unit when the BSU basic unit is inserted into the REU.

In accordance with an exemplary embodiment, additional controllers, monitoring modules, various data converters and interface drivers are also accommodated on the third circuit board (the mainboard REU). In accordance with an exemplary embodiment, the power supply module includes three separate stages (separate boards interconnected by plug connectors) which, if required, can be individually exchanged, modified, or completely omitted. The protection stage 36 serves for shielding and filtering line-connected electromagnetic interference as well as for protection against overvoltage and undervoltage up to a defined degree. The hold-up stage 37 accommodates large capacitors and a corresponding control unit to supply power to the unit during short interruptions of the power supply. The supply stage 38 is equipped with the necessary DC-DC converters and other controllers to supply all required supply voltages in the appropriate quality with sufficient load capacity.

FIG. 8 shows again the points of the REU in a perspective illustration. The chassis 61 and the two device connector plugs for data 60 and power 59 on the underside are the parts visible from the outside. The device connector plug 59 for power thereby connects an external power supply to the power supply module within the extension unit, whereas the connector plug for data 60 serves for connecting an external processing or storage unit to the processing unit of the radar system.

Figure 8:
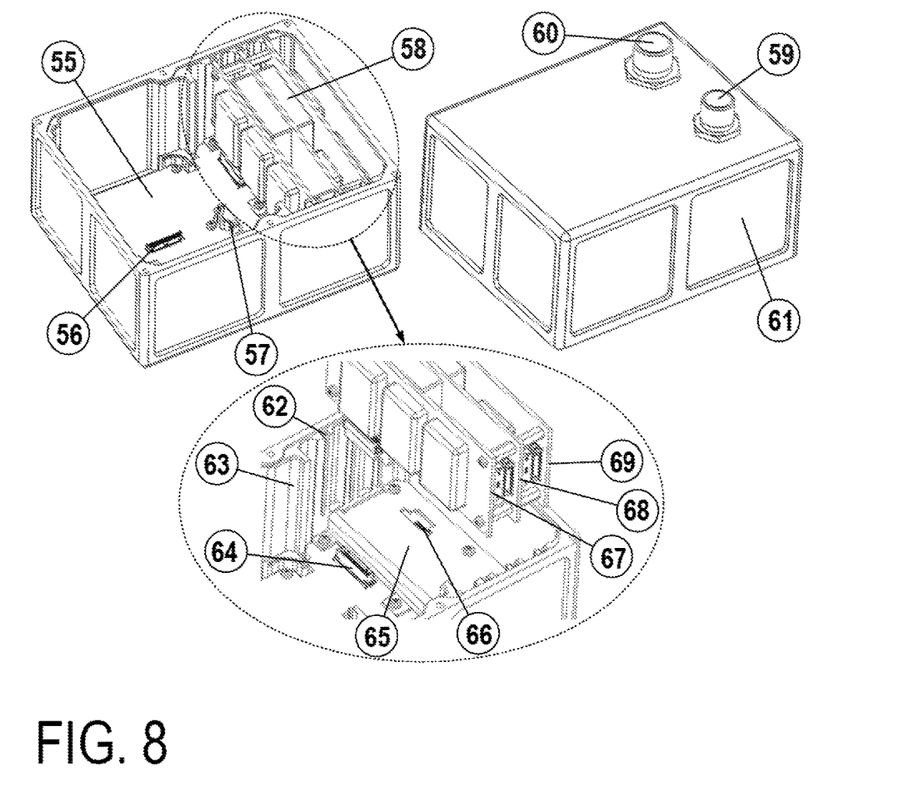
FIG. 8 shows a perspective view of the REU according to an exemplary embodiment of the invention.

The power supply module 58 is located inside the chassis and, as already mentioned, is put together using three boards. The power supply module is inserted into the guide grooves 62 provided in the chassis via the edges of the three boards 69, 68, and 67, and is thereby already laterally fixed. This is the same "screwless" assembly concept as for example used for the FCM within the BSU basic unit.

Figure 9:
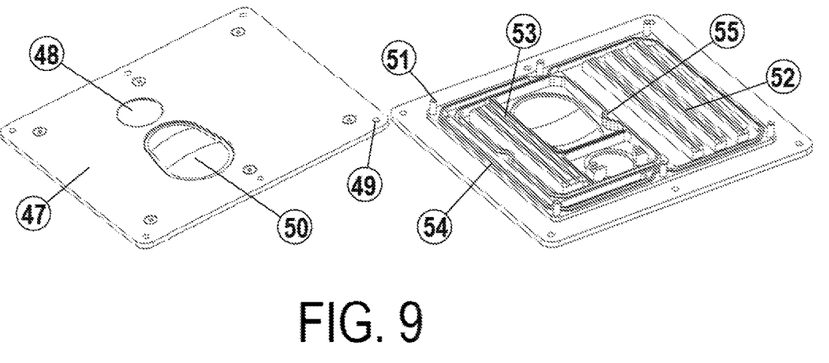
FIG. 9 shows a top attachment part of REU according to an exemplary embodiment of the invention.
Figure 10:
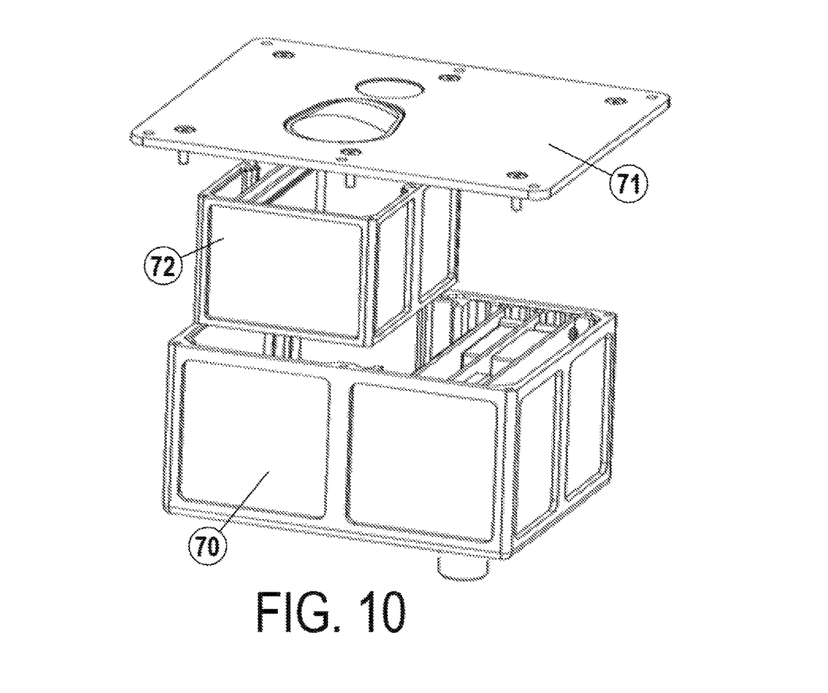
FIG. 10 shows a top configuration level 2 without sensors according to an exemplary embodiment of the invention.

Upwardly, the power supply module (PSM) is fixed via guide grooves 52 in the top cover (top attachment part—REU, TAP-REU) in accordance with FIG. 9. In this case, the groove surface is preferably covered with a thin rubber layer to exert a continuous pressure on the board edges in the groove when the TAP-REU top cover is in place so that it cannot move jerkily during strong impacts. The PSM power supply module is connected to the mainboard of the REU via the seventh plug connector, configured here as the two input 66 and output plug connectors 64. To shield the PSM power supply module from irradiating electromagnetic fields and the environment from emanating electromagnetic fields, an EM shield is located between the PSM power supply module and the mainboard of the REU. It only contains one opening for the input plug connector of the PSM. To install the BSU basic unit 72 as shown in FIG. 10 in the REU chassis 70, there is also a "screwless" assembly concept utilized. For this purpose, rounded guide edges are provided in the REU chassis which within a well-defined tolerance guide the BSU vertically along its four also rounded outer edges. Along the relatively long guide surface, this minimal tolerance nevertheless offers a very good positioning accuracy.

On the bottom of the REU chassis, there are six sockets, which on their upper side have parts of the BAP-BSU sealing profile. This also ensures a sufficient horizontal positioning accuracy of the BSU in the REU chassis. When the BSU is inserted into the REU chassis, an electrical connection is established via the third connector on the underside of the first circuit board (the BSU central connector) and the seventh connector of the third circuit board (the BSU mainboard connector 56 of the extension unit for connection to the BSU basic unit). After selecting a radar module and possibly one of the optional additional sensor modules and integrating them into the BSU, the REU chassis can be closed with the TAP-REU top cover 71. In accordance with FIG. 9, the TAP-REU includes a solid aluminum alloy or a solid electrically conductive material alloy with integrated radome 50 and an optical window 48 identical to those of the TAP-BSU. In addition, the TAP-REU includes on the underside structural elements 53 identical as well as corresponding and interlocking, respectively, with those on the underside of the TAP-BSU. As a result, the BSU within the RCU chassis is firmly clamped between the chassis and the TAP-REU so that it can no longer move, thus ensuring a secure fit even in the most adverse environmental conditions (vibration, shock).

When assembling all of the described components, namely the BSU basic unit 72, the REU extension unit 70 and the associated second TAP-REU 71 top cover in accordance with FIG. 10, a sensor device in accordance with extension stage 2 (TCL2) is achieved.

The main extension stage 3 in accordance with an exemplary embodiment is now described below.

In this extension stage, a third top cover, to be used in place of the second top cover for the extension unit for attachment to the extension unit, has a patch-array radar module mounted on the underside or the inside, respectively, of the third top cover as well as a radome above the patch-array radar module and thus forms an "enhanced antenna unit" 73, and further has a second processing unit 74 connected to the bottom of the patch-array radar module by a plug connector, which is connectable by a plug connector attached to its underside to a corresponding plug connector of the first circuit board of the basic unit.

Figure 11:
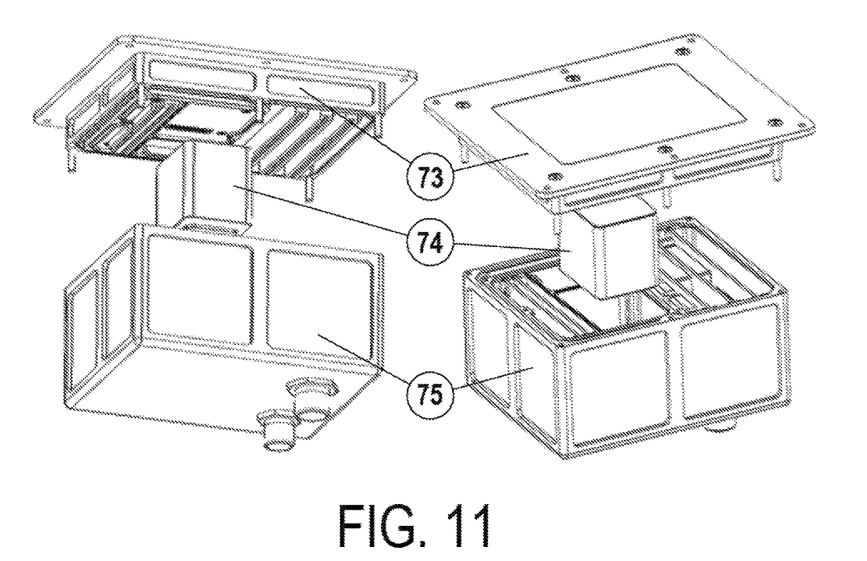
FIG. 11 shows a top configuration level 3 according to an exemplary embodiment of the invention.

The enhanced antenna unit (EAU) in conjunction with the preceding system components, in accordance with an exemplary embodiment, forms the third and highest extension stage of the scalable sensor device system. This extension stage, the top configuration level (TCL) 3, is shown in FIG. 11.

It includes the REU extension unit 75 with an integrated BSU basic unit, the EAU "enhanced antenna unit" 73 and an additional second processing unit, the processing power extender (PPE) 74. In this exemplary embodiment, the PPE 74 belongs to the third top cover, but it can also be regarded as a separate element since it is connected to it, for example, by a plug connector.

In this extension stage, the third EAU top cover forms a complete patch-array radar module, whereby the options of the preceding radar modules are eliminated; the basic unit thus does not contain any longer a radar module, instead, the first cell serves to receive the second PPE processing unit.

Depending on the arrangement and control of the individual patch antennas, the patch-array radar is capable of generating a wide range of directional characteristics. This makes it possible to perform a pivoting radar beam or also multiple-target detection for imaging radar measurements.

Since such a complex radar control and data evaluation are very computing-intensive and need to take place under real-time conditions, the PPE 74 is preferably provided. In accordance with an exemplary embodiment, this is a highly thermally conductive and electromagnetically shielded box having two plug connectors on the top and underside and which is securely bolted to the EAU 73. The plug connector on top establishes the connection to the EAU 82 (data, control, supply, monitoring). The lower plug connector forms the counterpart of the first plug connector of the first circuit board, the universal radar module interface in the BSU basic unit (data, control, supply, monitoring) for the connection of a radar module. In the PPE, there are preferably several FPGAs and microcontroller chips, which handle the coordination of the antenna patches as well as the pre-processing of the resulting radar data. The pre-processed data are then transferred from the PPE to the first FCU processing unit in the BSU basic unit and further processed there.

Figure 12:
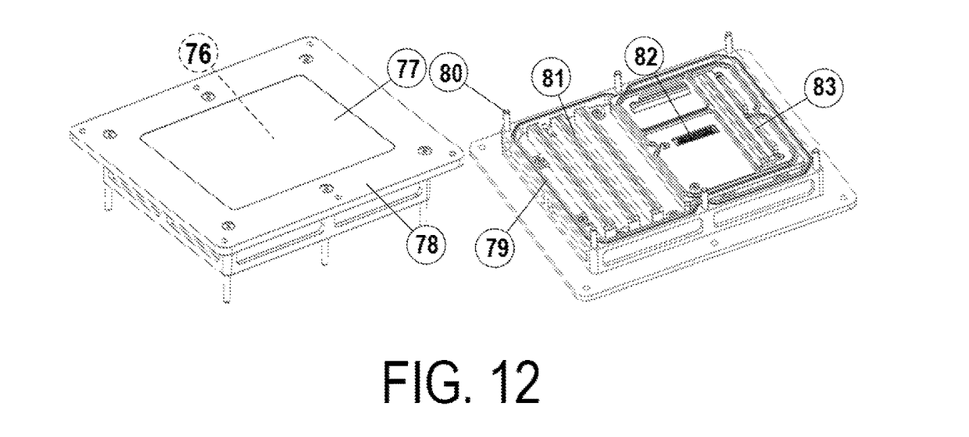
FIG. 12 shows third EAU top cover according to an exemplary embodiment of the invention.

The said third EAU top cover is shown in FIG. 12. The part visible from above consists of the "chassis" or "housing" or "housing element" 78, respectively, of the third EAU top cover carrying the other components of the third top cover and a flat radome 77.

Beneath the radome there is a patch-array board 76 which includes the individual antenna patches and connects them electronically or in regard to HF technology to the rest of the electronic components. The inside of the EAU chassis has a multilayer construction. Visible from below are, again, only the same profile components which are also contained in the second TAP-REU top cover, with the exception of the optical window and the radome. These profile components are guide grooves for the power supply module of the extension unit (REU-PSM) 81 and the guide grooves and sealing profiles of the first top cover for the basic unit (TAP-BSU) 83. The chassis of the third EAU top cover also has a corresponding sealing profile 79 with an inserted rubber seal to make a sealed connection with the chassis of the extension unit after the screw connection 80 of the two units which is protected against environmental influences. Upon assembly of the EAU 73, 74 and the REU 75 in accordance with FIG. 11, a sensor device according to extension stage 3 (TCL3) is achieved.

It should be noted that, with the embodiments described above, a highly flexible and cost-effective radar system with a wide variety of capabilities and being easy to manufacture can be provided.

It is understood that the foregoing description is that of the exemplary embodiments of the invention and that various changes and modifications may be made thereto without departing from the spirit and scope of the invention as defined in the appended claims.

What is claimed is:

1. A kit for a modular radar system, the kit comprising:
   a basic unit having a housing open at the top side with side faces and a first printed circuit board fastened to an underside of the basic unit, the basic unit being subdivided into at least one first and one second cell by one or more partition walls configured as electromagnetic compatibility (EMC) partition panels;
   wherein the first cell is configured for receiving a radar module selected from a plurality of selectable radar modules, and on the first printed circuit board in an area of the first cell, a first plug connector for connecting the selected radar module is provided;
   wherein the second cell is configured for receiving at least one second circuit board having a processing unit for connecting to the radar module, and on the first circuit board in and area of the second cell, a second plug connector is provided for connecting the processing unit;
   wherein the first circuit board is configured with electrical connections between the first and second plug connectors to connect the processing unit with the radar module;
   wherein the first circuit board has a third plug connector arranged on an underside of the first circuit board;
   a top cover for the basic unit configured for being fastened to the basic unit, the top cover having a radome in the area of the first cell; and
   a bottom cover for the basic unit configured for being fastened to the basic unit, the bottom cover having a power supply module configured for supplying a voltage, a data interface module configured for transferring data, and
   a fourth plug connector arranged on an upper side of the bottom cover and configured for connecting the fourth plug connector to the third plug connector on the underside of the first circuit board corresponding thereto, and to connect the power supply module and the data interface to the processing unit and/or to the radar module.

2. The kit according to claim 1, further comprising:
   a third cell arranged in the basic unit and configured for receiving a sensor module, and
   wherein a fifth plug connector is arranged on the first circuit board in an area of the third cell to connect the first circuit board to the processing unit and to establish a connection to the processing module.

3. The kit according to claim 2, wherein the sensor module is an optical sensor module, and
   wherein the top cover in the area of the third cell has an optical window to enable the optical sensor module to acquire data.

4. The kit according to claim 2, further comprising:
   an extension unit for hardening against environmental effects, the extension unit having an extension housing open at a top side, side faces, an extension unit bottom cover fastened to the underside of the basic unit or integrally configured with the housing, and a third circuit board with electrical connections configured therein, the extension unit comprising:
   a first area configured for receiving the basic unit without the extension unit bottom cover;
   a second area for receiving a power supply module;
   wherein a sixth plug connector is arranged on a top of the third circuit board in the first area to connect the basic unit to the extension unit by the third plug connector on the underside of the first circuit board of the basic unit;
   wherein a seventh plug connector is arranged on the top of the third circuit board in the second area to connect the power supply module to the extension unit;
   wherein the third circuit board includes leads configured to connect the basic unit connected via the sixth and seventh plug connectors to the power supply module, and to connect a data interface on the third circuit board to the base unit so as to connect the power supply module that is connected to the extension unit and the data interface to the processing unit and/or to the radar module;
   wherein the radome of the top cover for the basic unit is a first radome;
   a first top cover for the extension unit configured for being fastened to the extension unit, the first top cover having a second radome within the first area in the area of the first cell of the basic unit, and an optical window in the area of the third cell; and an eighth plug connector arranged on the underside of the extension unit bottom cover and configured to connect the power supply module to an external power supply and to transfer data generated by the processing unit through the data interface to another processing unit or a storage unit outside of the modular radar system.

5. The kit according to claim 1, wherein the power supply module comprises:

a protection stage configured for shielding and filtering line-connected electromagnetic interference and/or for protecting against overvoltage and undervoltage;

a hold-up stage including large capacitors and a control unit configured to continue supplying power to the kit in the event of an interruption of power supply; and a supply stage including DC-DC converters, wherein the protection stage, the hold-up stage and the supply stage are separate stages.

6. The kit according to claim 5, wherein the protection stage, the hold-up stage and the supply stage are arranged on separate circuit boards and the separate circuit boards are connected by plug connectors, and wherein the supply stage includes additional regulators to deliver required supply voltages.

7. The kit according to claim 4, wherein the seventh plug connector for connecting the power supply module comprises:

an input plug connector connected to the eighth plug connector and configured to connect the power supply module to an external power supply;

an output plug connector configured to deliver the supply voltage delivered by the power supply module via the third circuit board to the basic module, and an EMC shield arranged in the second area and only being perforated by an input connector.

8. The kit according to claim 4, further comprising:

a third top cover for the extension unit to be used in place of a second top cover for the extension unit configured to be fastened to the extension unit, the third top cover comprising:

a patch-array radar module mounted on an inside of the third top cover;

a third radome arranged above the patch-array radar module; and a second processing unit connected by a plug connector to an underside of the patch-array radar module, wherein the second processing unit is connected to the corresponding first plug connector of the first circuit board by a plug connector arranged on an underside of the second processing unit.

9. The kit according to claim 1, further comprising:

first guide grooves arranged on two side walls of the basic unit and configured for inserting the second circuit board into the basic unit and to fix the second circuit board therein; and second guide grooves arranged on the top cover and the top of a lower termination of the basic unit and configured for fixing the second circuit board when the top cover is fastened.

10. The kit according to claim 1, further comprising an EMC shielding plate arranged on the bottom cover to shield the power supply module and the data interface module from the first circuit board of the basic unit after attaching the bottom cover to the basic unit.

11. The kit according to claim 4, further comprising guide grooves arranged in the extension unit to fix the power supply unit upon insertion of the power supply unit in the extension unit.

12. The kit according to claim 1, wherein at least two grooves are provided in the extension unit, and wherein the at least two grooves guide the basic unit vertically along two outer edges of the basic unit within a predefined tolerance.

13. The kit according to claim 1, wherein at least four grooves are provided in the extension unit, and wherein the at least two grooves guide the basic unit vertically along four outer edges of the basic unit within a predefined tolerance.

14. The kit according to claim 1, wherein rounded guide edges are provided in the extension unit, wherein the basic unit has rounded outer edges, and wherein the rounded guide edges guide the basic unit vertically along at least two of the rounded outer edges within a predefined tolerance.

15. The kit according to claim 8, wherein on the underside of the second top cover for the extension unit the second top cover for the extension unit has structural elements that correspond to structural elements of the top cover of the basic unit to achieve a cover of the basic unit in a same way as the first cover and to stabilize the basic unit additionally by interlocking structural features between the basic unit and the second top cover.

* * * * *